(12) United States Patent
Hicks

(10) Patent No.: US 7,666,312 B2
(45) Date of Patent: Feb. 23, 2010

(54) METHOD OF INHIBITING CORROSION IN INDUSTRIAL HOT WATER SYSTEMS BY MONITORING AND CONTROLLING OXIDANT/REDUCTANT FEED THROUGH A NONLINEAR CONTROL ALGORITHM

(75) Inventor: Peter D. Hicks, Aurora, IL (US)

(73) Assignee: Nalco Company, Naperville, IL (US)

(*) Notice: Subject to any disclaimer, the term of this patent is extended or adjusted under 35 U.S.C. 154(b) by 127 days.

(21) Appl. No.: 11/692,542

(22) Filed: Mar. 28, 2007

(65) Prior Publication Data

US 2008/0237143 A1    Oct. 2, 2008

(51) Int. Cl.
C02F 1/70 (2006.01)
C02F 1/72 (2006.01)

(52) U.S. Cl. .................. 210/746; 210/757; 210/758; 422/7; 422/11; 422/16; 422/18; 700/266

(58) Field of Classification Search ............... 210/746, 210/739, 747, 757, 758, 96.1, 103, 143, 177; 204/408; 422/3, 11, 13, 14, 16, 18, 7; 700/266; 702/183

See application file for complete search history.

(56) References Cited

U.S. PATENT DOCUMENTS

| | | | |
|---|---|---|---|
| 4,269,717 A | | 5/1981 | Slovinsky |
| 4,574,071 A | | 3/1986 | DeSilva et al. |
| 4,648,043 A | * | 3/1987 | O'Leary ............... 700/285 |
| 4,775,005 A | | 10/1988 | Beyer et al. |
| 4,830,757 A | * | 5/1989 | Lynch et al. ............ 210/742 |
| 5,236,845 A | | 8/1993 | Pierce et al. |
| 5,243,297 A | | 9/1993 | Perkins et al. |
| 5,268,092 A | * | 12/1993 | Eden ....................... 210/96.1 |
| 5,332,494 A | | 7/1994 | Eden et al. |
| 5,342,510 A | | 8/1994 | Eden et al. |
| 5,348,664 A | * | 9/1994 | Kim et al. .............. 210/746 |
| 5,422,014 A | * | 6/1995 | Allen et al. ............ 210/743 |
| 5,470,484 A | * | 11/1995 | McNeel .................. 210/746 |
| 5,855,791 A | * | 1/1999 | Hays et al. ............. 210/696 |

(Continued)

FOREIGN PATENT DOCUMENTS

JP    2003/254503    9/2003

OTHER PUBLICATIONS

Filer, "Power Plant Chemistry Measurement Advancements: Oxidation Reduction Potential", Ultrapure Water, Nov. 1998, pp. 53-62. Note: This reference was cited on 1449 received Feb. 23, 2009 and was submitted as NPL Prior Art. However the copy received is missing pp. 54, 56, 59, 61. The copy cited here and included with this action is complete.*

(Continued)

Primary Examiner—Duane Smith
Assistant Examiner—Paul J Durand
(74) Attorney, Agent, or Firm—Edward O. Yonter; Michael B. Martin

(57) ABSTRACT

This invention provides a method of preventing corrosion in industrial water systems. The method includes maintaining a real-time oxidation-reduction potential at a set point, wherein the system is at operating temperature and pressure. A nonlinear equation is derived based upon theoretically derived or empirically collected data. The equation is then used to determine an inflow of active chemical species to the water system.

25 Claims, 6 Drawing Sheets

Amount of oxygen scavenger (EA) needed to achieve the given @T ORP™. The resulting DO concentration of the water is shown on the Y2 logarithmic axis.

Feedwater flow variations and resulting @T ORP™ variations in a boiler feedwater system.

U.S. PATENT DOCUMENTS

| | | | |
|---|---|---|---|
| 6,068,012 A * | 5/2000 | Beardwood et al. ............. 137/3 |
| 6,077,445 A * | 6/2000 | Ascolese .................... 210/746 |
| 6,391,256 B1 | 5/2002 | Moon et al. |
| 6,402,984 B1 | 6/2002 | Nakajima et al. |
| 6,409,926 B1 * | 6/2002 | Martin ....................... 210/709 |
| 6,510,368 B1 * | 1/2003 | Beardwood et al. ......... 700/266 |
| 6,609,070 B1 | 8/2003 | Lueck |
| 6,620,315 B2 * | 9/2003 | Martin ...................... 210/96.1 |
| 6,813,532 B2 | 11/2004 | Eryurek et al. |
| 7,141,175 B2 * | 11/2006 | Verma ........................ 210/739 |
| 2001/0047221 A1 * | 11/2001 | Fowee ........................ 700/202 |
| 2003/0004681 A1 * | 1/2003 | Fandrich et al. ............ 702/183 |
| 2003/0234219 A1 * | 12/2003 | Verma ........................ 210/614 |
| 2006/0157420 A1 | 7/2006 | Hays et al. |
| 2006/0169646 A1 * | 8/2006 | Andree et al. ............... 210/739 |
| 2006/0182651 A1 | 8/2006 | Bailey et al. |

OTHER PUBLICATIONS

Buecker B., "Water Treatment: The Continuing Battle Against FAC," Power Engineering, Pennwell Publishing Co., Tulsa, OK, vol. 106, No. 9, Sep. 1, 2002.

Dedekind et al., "Oxygenated Feedwater Treatment at the World's Largest Fossil Fired Power Plant—Beware the Pitfalls," Power Plant Chemistry, vol. 3, No. 11, Nov. 2001.

Filer, "Power Plant Chemistry Measurement Advancements: Oxidation Reduction Potential," Ultrapure Water, pp. 53-62, Nov. 1998.

Haag, J. et al., "On-Line Measurement of Redox and Corrosion Potentials in Water for PWR Steam Generators," Kraftwerkstechnik, Kraftwerkstechnik GMbH,, Essen, DE, vol. 70, No. 3, Mar. 1, 1990, pp. 236-241.

Margulova, T.Kh. et al., "Conditions of Dosing Oxygen and Hydrogen Peroxide into the Condensate of Power Units of Supercritical Parameters (Abstract)," Teploenergetika, 1977.

Niedrach, L. W., "Electrodes for Potential Measurements in Aqueous Systems at High Temperatures and Pressures," Angewandte Chemie—International Edition in English, vol. 26, No. 3, Mar. 1987.

Uchino et al., "Study on the Practical Application of a Method for Corrosion Potential Measurement in a Water Quality Monitoring System used During Combined Water Treatment," PowerPlant Chemistry, vol. 3, No. 9, pp. 511 to 517, 2001.

* cited by examiner

Amount of oxygen scavenger (CHZ) needed to achieve the given @T ORP™.

Amount of oxygen scavenger (CHZ) needed to achieve the given @T ORP™.
The resulting DO concentration of the water is shown on the Y2 logarithmic axis.

Amount of oxygen scavenger (EA) needed to achieve the given @T ORP™.
The resulting DO concentration of the water is shown on the Y2 logarithmic axis.

Feedwater flow variations and resulting @T ORP™ variations in a boiler feedwater system.

METHOD OF INHIBITING CORROSION IN INDUSTRIAL HOT WATER SYSTEMS BY MONITORING AND CONTROLLING OXIDANT/REDUCTANT FEED THROUGH A NONLINEAR CONTROL ALGORITHM

TECHNICAL FIELD

This invention relates generally to methods of inhibiting corrosion of metallic surfaces in aqueous systems, such as industrial cooling and boiler water systems. More specifically, the invention concerns methods of controlling the feed of oxygen scavengers, metal passivators, and other reductants/oxidants to industrial water systems to control the potential for corrosion in such systems. The invention has particular relevance to feeding reductant hot water system chemicals based off electrochemical potentials with such chemical feed rates calculated based on a nonlinear equation of the system feedwater or steam flow rate.

BACKGROUND

The affinity of oxygen for engineering alloys used in the industrial water industry is the cause of many complex corrosion phenomena, which not only depends on the amount of oxygen in a system, but also on factors such as the water chemistry, system design, and metallurgy. For example, the presence of other species in the water could turn oxygen into an aggressive corrosive force, or could render the metallurgy passivated. Additional important factors include temperature, pressure, fluid velocities, and other operational practices. While oxygen might be a primary or essential component in the corrosion process, it is usually not the only one.

Conventional means for reducing oxygen corrosion in water systems is to remove most of the molecular dissolved oxygen ("DO") by mechanical and chemical means. The vast majority of DO can be reduced into the ppb regime by the use of mechanical deaeration, where the water is typically heated to above its boiling temperature in a vented vessel. The solubility of the DO in water decreases as the temperature increases. Flow dynamics and operational issues particular to deaerators ("DA") leave some DO in the water—typically sub parts per million. The chemicals used to reduce DO values further to reproducibly low and constant values are called oxygen scavengers. Many of these scavengers also function as passivating corrosion inhibitors.

Deaerators do not always work perfectly. If they did, a pure scavenger might never be needed, although a chemistry regime that enhances metal passivation would be a positive addition. Thus, in some cases, the oxygen scavenger is added as an insurance policy against the possibility that the DA might malfunction. The scavenger can also be added to combat air in-leakage, which might occur at boiler feedwater ("FW") pumps, for example.

In the case of boilers, the amount of oxygen scavenger fed to the boiler FW has been traditionally based on the amount of DO in the FW plus some excess amount of scavenger. The amount of excess scavenger fed is typically based on the desired residual scavenger concentration in the boiler FW or boiler water itself, which is a function of the excess concentration of scavenger and boiler cycles. Conventional wisdom teaches that oxygen scavenger feed varies linearly with system flow rates and scavenger pumps can be "slaved" to system flow rates.

Several problems exist with this feed control scheme. First, is the absence of active control of scavenger feed rate. Instead, implied feed is based on system flow rates. High DO conditions could exist for long periods of time before a decrease in scavenger residual occurs and corrective action is taken. A second issue is that the presence of residual scavenger in the boiler water simply does not mean that the system is being treated satisfactorily. Depending on the conditions (e.g., low temperature or short residence time) it is possible to have both high oxygen concentrations and sufficient scavenger in the FW at the same time. While oxygen attack might be most aggressive in the FW system including the boiler FW heaters and economizer regimes, water containing DO can reach the boiler. When this oxygen rich FW reaches the boiler, oxygen is flashed off with the steam leaving the unreacted scavenger in the boiler water. In the extreme case, resulting in unacceptably high DO levels in the pre-boiler and condensate systems while having the expected residual concentrations of oxygen scavenger in the boiler itself.

Typically, for plants using sulfite-based oxygen scavengers, a sulfite residual is maintained in the boiler itself that might be checked once per shift. Boiler FW sulfite residuals are generally not measured and are unknown. Plants using other DO scavengers/passivators, such as hydrazine, carbohydrazide, erythorbic acid, diethylhydroxylamine, methylethylketoxime, hydroquinone, and the like, a fixed scavenger residual is generally maintained in the boiler FW. Residuals might be checked once a shift or online. Control is relatively straightforward in these systems and can be effective in "stable" systems. There is generally no response to "short-lived" changes in chemical demand and also no correlation between product feed and real-time system corrosion potentials. Although rare in most industrial boiler FW systems, DO concentrations might be measured. In the vast majority of cases, oxygen scavengers are fed at a constant feed rate and residuals are measured periodically. In this type of scheme, scavenger residuals are based off historical data (using grab samples), which typically misses the dynamic FW reduction-oxidation stresses.

The next more sophisticated approach is to feed scavenger based off a linear equation relating scavenger pump speed to boiler FW flow or steam load. This approach appeals to one of the stresses experienced by a DA—namely boiler FW flow. The problem is that it does not address input variation stresses (makeup versus condensate return flow into the DA and DO variations of the incoming DA feedwater). One does not know if scavenger is fed into the system unless residuals are measured.

Tracer chemicals can also be formulated with other "active" boiler water chemicals in different ways. For example, the feed of the active chemical may not be measured; rather, the feed of a traced species is measured. When the specific formulation is known, it is possible to calculate the active chemistry based upon the measured tracer signal. This method usually involves basing scavenger feed off an inert tracer signal (e.g., adding an inert tracer chemical to the active scavenger). Operators would need to check scavenger consumption from time to time and should also measure DO from time to time. The feed of scavenger could also be slaved to a boiler water internal treatment tracer signal. Tracer concentrations would vary linearly with flowrate. Still, a user would not know if scavenger were getting into the FW unless a residual test was run. Scavenger need might not be linearly proportional to FW flow. From an oxidation-reduction potential standpoint, it is not. Instead, this need is related to other factors, such as how much the DA is being stressed for the actual FW flow at any given time.

Scavenger feed may also be tracked with traced actives. For example, gallic acid can be traced as an oxygen scavenger itself (See U.S. Pat. Nos. 6,436,711 B1 and 6,566,139 B2). In this case, one knows what is going in (pump speed) and how much active is present in the system. It does not address, however, the amount needed based on DO variations, especially where the scavenging reaction is not complete at the point of measurement. Tracing both actives and oxygen scavenger products has also been practiced, for example, with gallic acid. This scheme still does not directly address the DO variations in real-time terms and the equilibrium that exists between the unreacted scavenger, dissolved oxygen, and reacted scavenger.

There thus exists an ongoing need for better and more efficient methods of managing and controlling active chemical species to maintain low corrosion conditions in industrial water systems. Current wisdom is to feed such species at concentrations linearly with respect to FW flow. This linear scheme is inadequate when trying to control ORP, especially without ORP measurement devices. An ideal method would include determining an oxygen scavenger feed into the system using a nonlinear control scheme based on system variables such as those described below.

SUMMARY

Accordingly, this invention provides a method including a novel control algorithm to maintain constant oxidation-reduction potential ("ORP") in industrial water systems. The premise is to achieve constant corrosion potentials by measuring FW flow or steam flow and controlling the pump speed of the oxygen scavenger/reductant according to a nonlinear equation derived based upon system parameters. Thus, oxygen scavenger dose pump speed will not vary linearly with the boiler FW flow, but rather in an exponential or nonlinear fashion. The exact equation (explained in more detail below) will depend on the reductant used, water chemistry, and system specifics of the plant FW being controlled.

It should be appreciated that the described method might be used or applied in many locations within the same plant or system, where the system is typically a hot water system but might be any industrial water system. For example, the final FW entering a boiler system might be made up of various FW sources that become combined into one system flow. There might be this type of control on all or any number of these FW sources.

The disclosed method includes an algorithm having an exponent-driven oxygen scavenger/reductant feed system. In an embodiment, the method includes preventing corrosion in an industrial water system by maintaining a real-time ORP at an ORP set point. The method includes determining both the real-time ORP and the ORP set point. In a preferred embodiment, these values are determined when the system is at operating temperature and pressure. The method further includes determining concentrations of one or more active chemical species that influence the real-time ORP and determining a flow rate for the system. The flow rate typically includes the FW flow from one or more sources and/or the steam flow at one or more points.

Having as an input variable(s) one or more of the described values, a nonlinear control equation is created, formulated, or derived. The nonlinear equation is then activated to calculate an output. The output of the nonlinear control equation determines an inflow of the active chemical species to the industrial water system to maintain a constant ORP or ORP set point. Constant ORP implies that a nonlinear relationship of activity ratios of reductants, oxidants, and other products that affect ORP need to be controlled based on an equation independently derived for each application. In some cases, an equation used for one application may be used for another with little or no modification. In other cases, a unique equation may be needed for the application. In an embodiment, the method includes controlling reductant/oxygen scavenger levels in the system while maintaining a constant ORP in the system, without direct ORP measurement.

Ultimately, oxygen scavenger feed based off a REDOX-sensitive signal and an active response to all stresses is a reliable method of maintaining stable ORP. Minimizing REDOX variations (i.e., "REDOX Stress") in the FW ensures low corrosion rates at all times in the system. Set point and control schemes can be structured on an insurance basis. Less chemistry fed equates to less insurance for oxygen scavenging and metal passivation. In such a system, smart control can be introduced to react and alarm to situations as needed.

Well-established factors affecting ORP include DO, temperature, pH, reductant type/chemistry, and reductant concentration. For example, an increase of 1 pH unit generally decreases room temperature ORP by 59 mV. Temperature has a more complex relationship with ORP (the "E" term below) and is typically driven by a Nernstian-type equation, such as:

$$E = E^\circ - (RT/zF)\ln([\text{Oxidant}]^O/[\text{Reductant}]^R)$$

The logarithm term includes the activities of oxidized and reduced species according to their thermodynamic equilibria of reaction. Thus, ORP continues to vary if oxygen scavenger/reductant is tied to FW or steam flow in a linear fashion. The "E" term is not a linear function of concentration; rather, it is a logarithmic function including thermodynamic stoichiometry, which change as the FW dynamics and stresses on the DA change. For example, the concentration fed, reacted, and unreacted scavenger all exist at a location at a certain kinetic equilibrium that is influenced by factors that affect oxygen scavenging (e.g., catalyst presence, time, etc.). Using a linear function to tie reductant pump speed to FW flow is therefore insufficient. Furthermore, reactants and products typically vary in their reducing power with concentration.

It is an advantage of the invention to provide a method of preventing corrosion in an industrial water system by maintaining a real-time oxidation-reduction potential at an oxidation-reduction potential set point, wherein the system is at operating temperature and pressure.

Another advantage of the invention is to provide a method of maintaining a real-time oxidation-reduction potential in an industrial water system by using a derived nonlinear control equation to calculate an active chemical species inflow the system.

A further advantage of the invention is to provide a method of preventing corrosion in an industrial water system by maintaining a real-time oxidation-reduction potential at a set point without directly measuring the oxidation-reduction potential in the system.

Additional features and advantages are described herein, and will be apparent from the following Detailed Description, Examples, and Figures.

DETAILED DESCRIPTION

Figure 1:
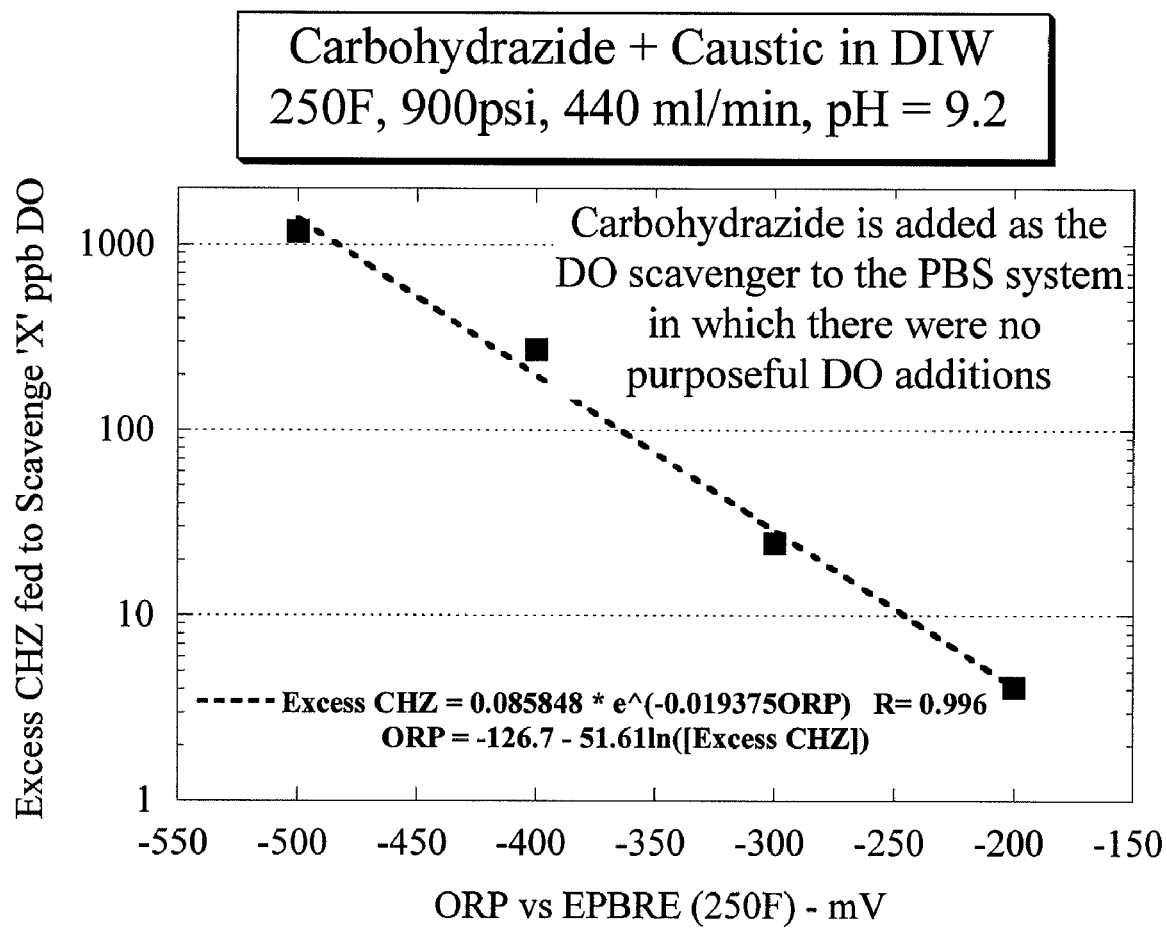
FIG. 1 illustrates an amount of carbohydrazide fed (y-axis) in order to maintain the @T ORP® (x-axis) (@T ORP is a registered trademark of Nalco Company, Naperville, IL ) at certain levels, as explained in Example 1.

As used herein, "industrial water system" or "system" refers to any system where hot water is in contact with metallic surfaces. "Hot water" means water having a temperature from about 37° C. up to about 370° C. The system may operate at or below atmospheric pressure or a pressure up to about 4,000 psi. A preferred industrial water system is a hot water system, such as an industrial boiler system, which typically has a water temperature of about 50° C. to about 320° C. and pressures reaching as high as about 3,000 psi.

"ORP," "@T ORP," or "at-T ORP" refers to oxidation-reduction potential for an industrial water system at operating temperature and pressure. In certain instances, ORP is indicated as room temperature ("RT") ORP.

"Active chemical species" refers to oxidants and reductants that have an affect on or influence the ORP.

"Controller system," "controller," and similar terms refer to a manual operator or an electronic device having components such as a processor, memory device, cathode ray tube, liquid crystal display, plasma display, touch screen, or other monitor, and/or other components. In certain instances, the controller may be operable for integration with one or more application-specific integrated circuits, programs, or algorithms, one or more hard-wired devices, wireless devices, and/or one or more mechanical devices. Some or all of the controller system functions may be at a central location, such as a network server, for communication over a local area network, wide area network, wireless network, internet connection, microwave link, infrared link, and the like. In addition, other components such as a signal conditioner or system monitor may be included to facilitate signal-processing algorithms.

In one embodiment, the method includes an automated control scheme. In another embodiment, the control scheme is manual or semi-manual, where an operator interprets the signals and determines FW chemistry, such as oxygen or oxygen scavenger dosage. In an embodiment, the measured ORP signal is interpreted by a controller system that controls a reductant feed according to the described method. In an embodiment, the controller system also interprets measured temperature to determine the amount of oxygen or oxygen scavenger to add, if any. The temperature detector might also be used for information purposes, such as in alarm schemes and/or control schemes. It should be appreciated that the control scheme may incorporate pump limiters, alarming, intelligent control, and/or the like, based off further inputs, such as pH, DO levels, and other water constituents/properties.

In a preferred embodiment, changes and adjustments to FW chemistry includes adding oxygen or one or more oxygen scavengers (i.e., reductants) to the FW. By definition, oxygen scavengers are reducing agents, although not all reducing agents are necessarily oxygen scavengers. Reducing agents, suitable as oxygen scavengers, satisfy the thermodynamic requirements that an exothermic heat of reaction exists with oxygen. For practical applications, reasonable reactivity is typically required at low temperatures. That is, there should be some favorable kinetics of reaction. Furthermore, other changes and adjustments to FW chemistry, such as for system control and corrosion control may include adding other oxidizing agents (oxidants) or other reducing agents (reductants).

It is also highly desirable that the reducing agent and its oxidation products are not corrosive and do not form products that are corrosive when they form in steam generating equipment. Typically, certain oxygen scavengers function optimally in certain pH ranges, temperatures, and pressures, and are also affected by catalysis in one way or another. The selection of the proper oxygen scavengers for a given system can be readily determined based on the criteria discussed herein.

Preferred reductants (i.e., oxygen scavengers) include hydrazine, sulfite, carbohyrazide, N,N-diethylhydroxylamine, hydroquinone, erythorbate or erythorbic acid, methyl ethyl ketoxime, hydroxylamine, tartronic acid, ethoxyquin, methyltetrazone, tetramethylphenylenediamine, semi-carbazides, diethylaminoethanal, 2-ketogluconate, N-isopropylhydroxylamine, ascorbic acid, gallic acid, hydroxyacetone, the like, and any combinations. It should be appreciated that any active chemical species may be used in the method of the invention.

This disclosure provides maintenance of constant ORP control zones. The described method uses the nonlinear relationship between FW flow in industrial water systems and ORP to calculate a required oxidant and/or reductant feed to maintain a constant ORP in the system. An initial analysis of the system includes gathering empirical data or theoretically calculating the ORP space (sometimes referred to herein as "REDOX Space") for a given system. According to alternative embodiments, this REDOX Space or ORP set point may be a specific value or a range and may be determined using empirical data or on a theoretical basis.

The ORP set point for a particular application is determined using a combination of many factors. Some of these factors have a scientific basis, such as minimizing corrosion rates, while other are limited by practical considerations, such as economic limitations (which may dictate, for example, that only a specific concentration range of chemical feed is to be used) for the particular application. A non-limiting set of factors include: boiler chemistry control philosophy; system temperatures at the point of control and/or at another point; baseline and residual DO; specific chemistries used; amount of scavenger consumed; amount of residual scavenger; pH; other REDOX active chemistries; engineering alloys of construction; general and local corrosion mitigation; dosing limitations; economics; system design specifics; special considerations, such as stress corrosion cracking and flow accelerated corrosion; and system variability. A person of ordinary skill in the art would be able to sort through such factors and determine the ORP set point.

Determining the real-time ORP may involve several different methods. In certain cases, practical @T ORP data measured in the laboratory may be applied to industrial systems. Such an application is limited to those cases where laboratory testing is setup to mimic industrial systems. That is, the laboratory system should be similar in REDOX Space to the expected/mimicked industrial system.

In an embodiment, the system ORP (i.e., real-time ORP) is directly measured at the exact point where control is to be performed. In another embodiment, the ORP is measured at another point in the system and the @T ORP at the point of control is then calculated. In a further embodiment, a fluid sample is taken from the system and the ORP is measured at room temperature and pressure, rather than at system operating temperature and pressure. The room temperature data is then used to calculate or infer the system @T ORP space. In still another embodiment, the ORP may be theoretically determined based on experience with similar systems possessed by a person of ordinary skill in the art. One such theoretical basis includes using a variation of a theoretical "Nernstian-type" equation to calculate the REDOX Space.

Another variable that may be incorporated into determining the nonlinear equation to control the active chemical species inflow to the system is the concentration of such species present in the system that have an affect on or influence the @T ORP™ Space. According to alternative embodiments, the system may include one, two, or more active chemical species, such as reducing and/or oxidizing agents. In an embodiment, these concentrations may be directly measured. In one embodiment, the species concentration is empirically determined and measured directly at a point of control. In another embodiment, the concentration is measured elsewhere in the system and calculated or extrapolated at the point of control based upon known thermodynamics and kinetics of the active species in oxygen scavenging reactions. In another embodiment, the concentrations are known from previous system analyses and/or design considerations. Alternatively, the concentrations are determined based on other knowledge from the system at hand, other similar system data, and/or laboratory data.

The system flow rate, either in terms of FW flow or steam flow, is another variable in the derived nonlinear equation. As described above for the chemical species concentrations, the system flow rate may be determined in a variety of ways. In alternative embodiments, the system flow rate may include FW flow, steam flow, boiler blowdown, and/or a measurement for stream losses. In an embodiment, the flow rate includes FW flow from one or more sources and/or steam flow at one or more points. The different sources and/or points may be collectively measured in additive fashion or may be independent and represent separate control points in the system. In one embodiment, the flow rate(s) are directly measured at a point of control or empirically determined. In another embodiment, the system flow rate is measured elsewhere in the system and calculated or extrapolated at the point of control based upon known fluid dynamics and/or other system parameters. In another embodiment, the system flow rate is known from previous system analyses and/or design considerations. Alternatively, it is determined based on other knowledge from the system at hand, other similar system data, and/or laboratory data.

In a further embodiment, determining the flow rate includes using one or more flow rate indicators. In this embodiment, the input variable(s) for the nonlinear equation include a flow rate indicator and the equation output includes a signal operable to control the inflow of the active chemical species. Representative flow rate indicators/meters include orifice plates, V-cone meters, rotameters, venture tubes, Pitot tubes, magnetic flow meters, positive displacement meters, turbine flow meters, ultrasonic flow meters, differential pressure flow meters, rotary flow meters, vortex flow meters, mass flow meters (e.g., Coriolis, Thermal, Hot-wire, etc.), the like, and combinations of these indicators.

The nonlinear control equation is used to calculate the concentration of active chemical species to achieve or maintain the desired @T ORP at the point of control. In an embodiment, the equation takes into account a decrease in active reductant due to system REDOX Space stressors, such as those due to oxygen scavenging reactions. The scavenger concentration is then related to the scavenger pump speed based on product actives concentrations in any scavenger product.

In an embodiment, creating or deriving the nonlinear equation includes repeating the described steps two or more times. For example, a first iteration may take place with a first flow rate and a first concentration of active chemical species and a second iteration may be with a second flow rate and a second concentration of active chemical species. In one embodiment, deriving the equation includes obtaining a first dataset with a first iteration and a second dataset with a second iteration, the first dataset including measured and/or theoretical data and the second dataset including measured and/or theoretical data. In another embodiment, deriving the equation includes a plurality of iterations each with a corresponding dataset.

Iterations may include more than one point of pump speed data (scavenger feed concentration) as it relates to different system flow rates to achieve a constant @T ORP. Typically, a minimum of two data points (empirical, calculated, or theoretical) is needed to achieve an accurate constant ORP-maintaining nonlinear equation. Any combination of empirical, calculated, or theoretical data may be used as it relates to the @T ORP Space to derive the nonlinear equation. For example, if a user has knowledge of @T ORP and system specifics, the control scenario could be envisaged without any empirical data whatsoever. More than two points of data, however, provides greater confidence in the final equation, which would typically take the form of the following.

$$\text{Scavenger Pump Speed (\%)} = A * e^{\wedge}(B * \text{Feed Water Flow (lb/hr)})$$

"A" and "B" are constants for the specific system and REDOX dynamics, which are calculated using a linear least squares fit of the above equation with two data points. Based on this final equation, a computer control sequence is typically setup whereby the pump speed is the output (for example, 4 to 20 mA signal to a scavenger feed pump) and the input to the computer control would be an indication of system flow rate. The result is that the feed of oxygen scavenger would follow the above general formula in order to maintain constant @T ORP conditions at a predetermined ORP set point. While this is a single input equation, it does not detract from the intent of the whereby some factor related to FW flow (i.e., a flow rate indicator) could be substituted for FW flow in the above equation or combined with other critical system parameters that might be very system specific. It is also not intended that the scavenger pump speed will necessarily increase with FW flow, as it might increase with decreasing FW flow (see Example 9).

EXAMPLES

The foregoing may be better understood by reference to the following examples, which are intended for illustrative purposes and are not intended to limit the scope of the invention.

Example 1

A laboratory study was performed in which the reducing agent carbohydrazide was added to a boiler feedwater simulator ("PBS"). Sodium hydroxide was also added to raise the pH of the deionized feed water ("DIW"). The DIW was added as feedwater to the mechanical deaerator, which removed most of the DO from the DIW (leaving about 1 to 4 ppb of DO). The carbohydrazide was fed to the storage section of the dearator. The water then passed from the DA to the NaOH dosing station and onto the feedpump. Flowrates through the rig were maintained at 440 ml/min by the feedpump. Water temperatures were raised to about 121° C. (250° F.) as water flowed in series through 10 tube-in-shell heat exchangers. The pressure in the system after the main feedpump was about 900 psi. After the heat exchangers, water flowed through an in-situ, at temperature and pressure, ORP measurement cell (e.g., as described in U.S. Pat. App. 2006/0182651 A1, "Method of Infhibiting Corrosion in Hot Water Systems," filed on Apr. 12, 2006, now pending or U.S. Pat. App. 2006/0179179 A1, "High Temperature and Pressure Oxidation-Reduction Potential Measuring and Monitoring Device for Hot Water Systems," filed on Jan. 29, 2007, now pending). The water was then cooled and depressurized before passing through an analytical test rack, where DO, room temperature ORP, specific conductivity, and pH of the water were measured at 25° C.

In this series of tests, pH was maintained at about 9.2 (at 25° C.). The amount of carbohydrazide (CHZ) fed was adjusted in order to maintain the @T ORP at the values shown in FIG. 1. The amount of CHZ fed is given in terms of the amount of oxygen that can be scavenged by the CHZ chemistry at equilibrium. As can be seen, the @T ORP varied linearly with the logarithm of the amount of CHZ added to the preboiler simulator. The actual equation in this case is shown in FIG. 1. The logarithmic relationship itself will depend on many factors. Just some of these factors will include temperature, specific oxidants and reductants present in the water and their interplay, and pH.

Example 2

A laboratory study was performed in which the reductant carbohydrazide was added to the PBS, as in Example 1. The difference in this Example was the addition of oxygen along with sodium hydroxide to the DIW. The DIW was added as FW to a mechanical DA and oxygen scavenger was fed to the storage section of the DA. The DA removed most of the DO (leaving about 1 to 4 ppb of DO). Water then passed from the DA to the NaOH dosing station and onto the feedpump. Flow rates through the rig were maintained at 440 ml/min by the feedpump. Water temperatures were raised to about 121° C. (250° F.) as water flowed in series through 10 tube-in-shell heat exchangers. The pressure in the system after the main feedpump was about 900 psi. After the heat exchangers, the water was dosed with oxygen saturated DIW and then flowed through an in-situ, at temperature and pressure, ORP measurement cell. In this case, only enough oxygen saturated water was added to raise the baseline DO concentration to about 25 ppb DO. The water was then cooled and depressurized before passing through an analytical test rack, where DO, room temperature ORP, specific conductivity, and pH of the water were measured at 25° C.

Figure 2:
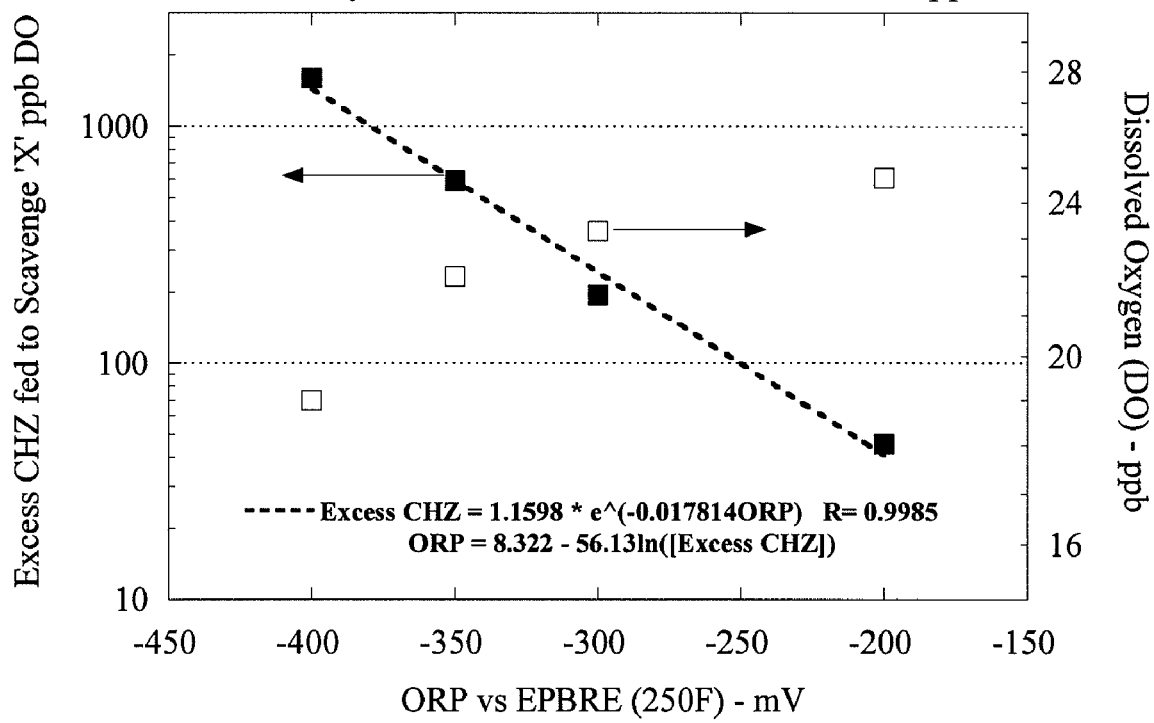
FIG. 2 shows an amount of carbohydrazide fed (y1-axis) in order to maintain @T ORP (x-axis) at certain levels along with a dissolved oxygen measurement (y2-axis), as explained in Example 2.

In this series of tests the pH was maintained at about 9.2 (at 25° C.). The amount of CHZ fed was adjusted in order to maintain the @T ORP at the values shown in FIG. 2. The amount of scavenger fed is shown in terms of the amount of oxygen that can be scavenged by the CHZ chemistry at equilibrium. The remaining DO concentrations are also shown in FIG. 2 (logarithmic scale) as not all the DO was scavenged by the CHZ. As can be seen, the @T ORP varied linearly with the logarithm of the amount of CHZ added to the preboiler simulator. The actual equation in this case is presented in FIG. 2. The logarithmic relationship itself will depend on many factors, as explained in Example 1.

Example 3

Figure 3:
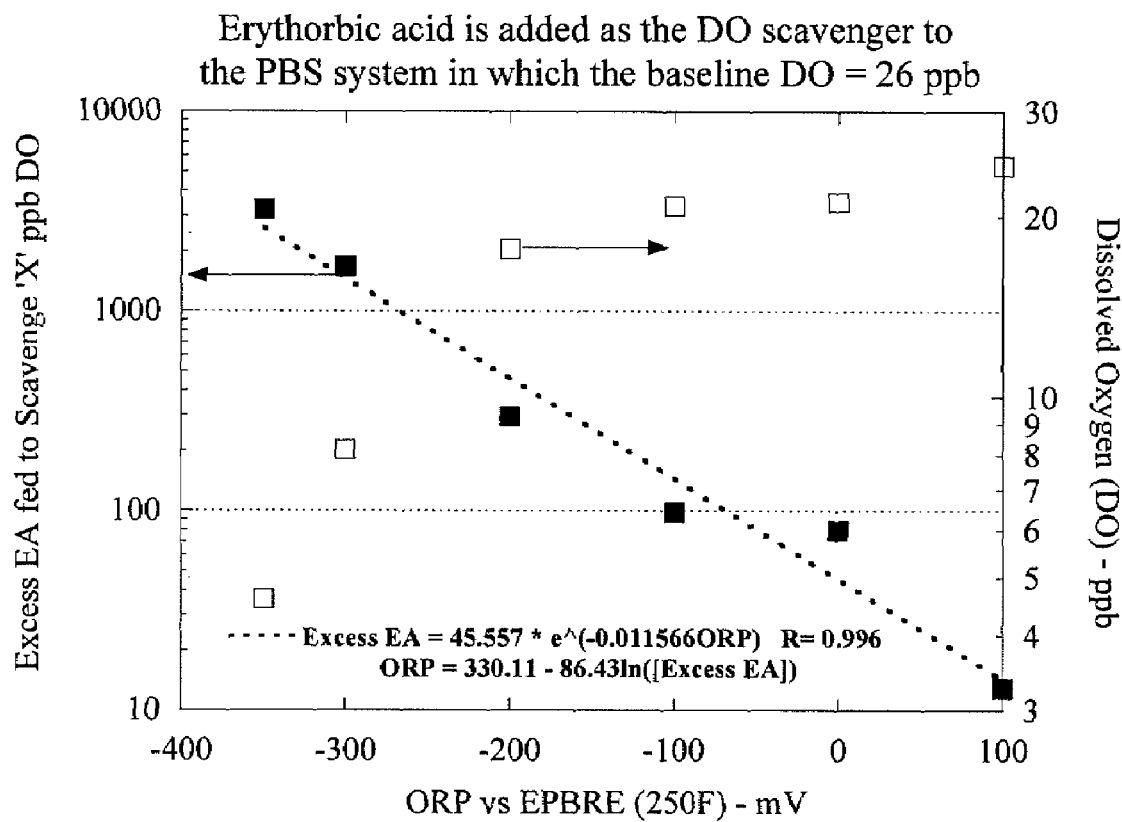
FIG. 3 shows an amount of erythorbic acid fed (y1-axis) in order to maintain ORP (x-axis) at certain levels along with a dissolved oxygen measurement (y2-axis), as explained in Example 3.

This Example was performed as Example 2, except that erythorbic acid (EA) was used as the reducing agent and the baseline DO was raised to about 26 ppb DO. The amount of EA fed was adjusted in order to maintain the @T ORP at the values shown in FIG. 3. The amount of scavenger fed is given in terms of the amount of oxygen that can be scavenged by the EA chemistry at equilibrium. The remaining DO concentrations are also shown in FIG. 3 (logarithmic scale), as not all the DO is scavenged by the EA. As can be seen, the @T ORP varied linearly with the logarithm of the amount of EA added to the preboiler simulator. The actual equation in this case is presented in FIG. 3. The logarithmic relationship itself will depend on many factors, as explained above.

Example 4

In this Example, an oxygen scavenger was fed at a wasteheat, boiler feedwater system in a Midwest plant. The plant was equipped with a DA for the mechanical removal of DO from the FW. Additionally, and in accordance with boiler best practices, an oxygen scavenger was fed to the DA storage section to chemically scavenge some of the remaining DO and provide metal passivation in the boiler FW, from the DA to the boiler itself. EA was added as the active oxygen scavenger component. Steam produced in the boiler was used to both generate electricity and provide plant steam for heating and cooling.

Figure 4:
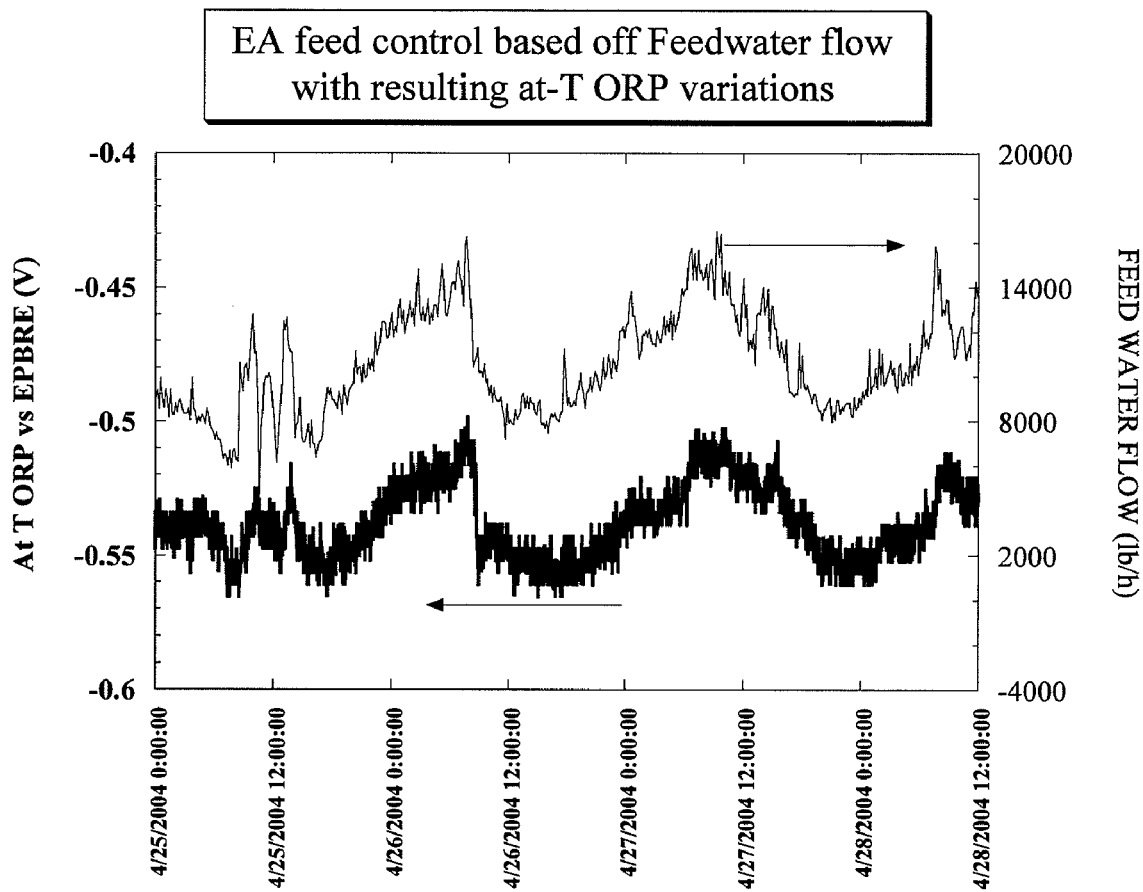
FIG. 4 correlates erythorbic acid feed based off feedwater flow (y2-axis) with resulting @T ORP variations (y1-axis), as explained in Example 4.

Knowing product concentrations, it had been deemed that in order to achieve an appropriate feedwater, active, erythorbic acid residual of about 11 ppb of DO scavenging equivalence, the chemical scavenger feed pump speed would be related to flow with the following equation: Pump speed (%)=0.5801(FW in klb/hr)−0.10942. So, for example, a FW flow of 10,000 lb/hr would result in an oxygen scavenger pump speed of 5.7% (at the given stroke percentage for that pump). FIG. 4 shows the @T ORP variations that occurred when this feed philosophy was followed. These variations were measured at the economizer inlet for the boiler after the main boiler FW pump. The ORP measurement cell used is described above. The @T ORP numbers were measured at FW temperatures of about 95° C. (203° F.) versus the external pressure balanced reference electrode (EPBRE). This reference electrode was a silver/silver-chloride reference electrode filled with 0.1 N KCl.

System pressure at the point of ORP measurement was about 900 psi. As seen in FIG. 4, changing the feed of scavenger feed linearly with FW flow (or an inert tracer) leads to variations in recorded @T ORP. During high feedwater feed periods, ORP numbers are higher than during lower feedwater flow periods. The implication is that during higher feedwater flow periods, a higher dose of oxygen scavenger is needed to keep @T ORP numbers lower (as for the low feedwater flow periods). That is, more than linearly proportional scavenger feed to feedwater flow is needed. In contrast with conventional wisdom of a person of ordinary skill in the art, ORP does not vary as a linear function with scavenger concentration and thus FW flow.

Example 5

An oxygen scavenger was fed at a boiler FW system in a Midwest plant for the pulp and paper industry. The plant had a DA for the mechanical removal of DO from the FW. Additionally, and in accordance with boiler best practices, an oxygen scavenger was fed to the DA storage section to chemically scavenge some of the remaining DO and provide metal passivation in the boiler FW, from the DA to the boiler itself. The active oxygen scavenger component added was carbohydrazide (CHZ). Steam produced in the boiler is used to both generate electricity and provide plant steam for heating and paper making operations.

Figure 5:
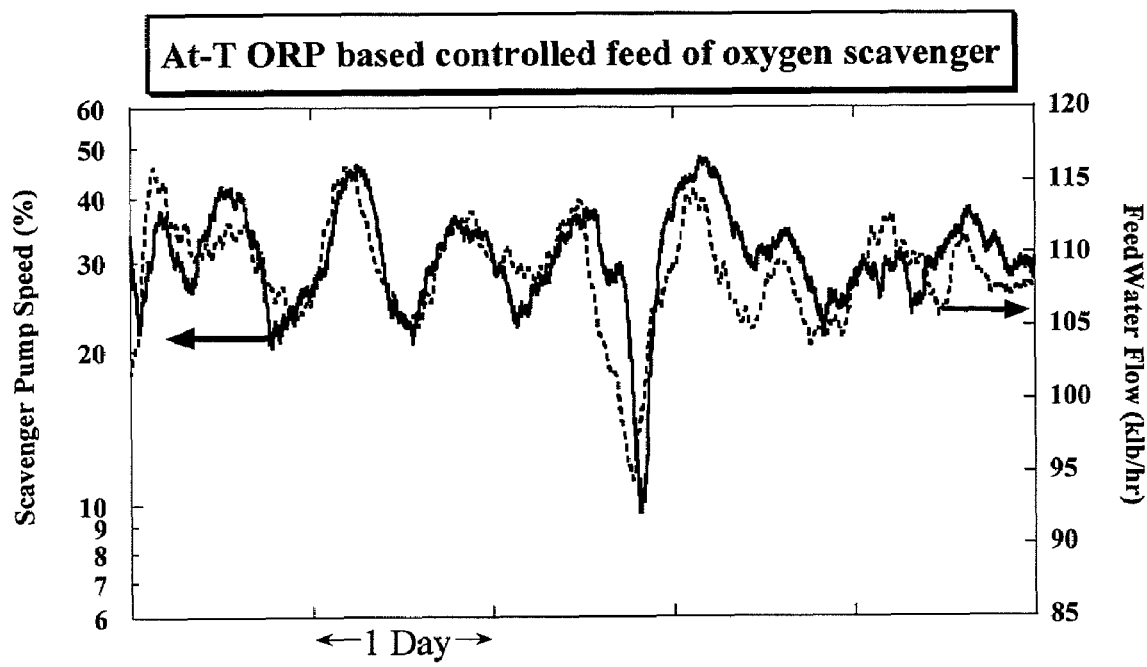
FIG. 5 illustrates feedwater flow variations (y2-axis) and oxygen scavenger pump speed (y1-axis) needed to maintain a constant @T ORP in boiler feedwater, where the @T ORP was maintained at −325 mV, as explained in Example 5.

During operations, the @T ORP was measured and controlled at the economizer inlet for the boiler after the main boiler FW pump. The ORP cell used is described above. The @T ORP numbers were measured and controlled at feedwater temperatures of about 105° C. (221° F.) versus the external pressure balanced reference electrode (EPBRE). This reference electrode was a silver/silver-chloride reference electrode filled with 0.1 N KCl. The system pressure at the point of ORP measurement was about 1000 psi. At-T ORP was maintained at about −325 mV versus the EPBRE (at 105° C. [221° F.]) at about 1,000 psi. Oxygen scavenger feed control was performed using PID (Proportional, Integral Derivative) controlled feed of the scavenger to the DA storage section. FIG. 5 shows that if this feed philosophy is followed, then there needs to be variations in scavenger pump speed in order to maintain a constant feedwater ORP state. These variations in pump speed can be seen to vary in a logarithmic fashion with linear FW flow. As can be seen, changing the feed of scavenger feed exponentially with FW flow (or an inert tracer) leads to constant @T ORP conditions. During high FW feed periods, scavenger feed rates need to be much higher than those predicted by linear concentrations of scavenger in the FW to achieve a constant @T ORP condition.

The implication is that during higher FW flow periods, more scavenger is needed to keep @T ORP numbers lower, as compared to the low feed water flow periods. That is, a non-linearly proportional scavenger feed to FW flow is needed. The pump speed does not vary as a linear function with feed water flow and thus scavenger concentration. In this case, the feedwater flow varies from about 95 to 115 klb/hr (115 is a 21% increase above 95), whereas the scavenger flow rates vary from about 10 to 50% (50% is a 400% increase over 10%) in order to maintain constant ORP conditions.

From the above data, it can be extrapolated that a feed of scavenger (for this plant) according to the following equation will lead to fairly stable @ T ORP conditions, without actually measuring @T ORP.

$$\text{Scavenger Pump Speed (\%)} = 0.095 * e^{(0.052 * \text{Feed Water Flow (klb/hr)})}$$

Other REDOX stress factors could then be included in the above equation for tighter "control." These factors might include any item that could impact @T ORP, such as dissolved oxygen, pH, other chemical species present, mechanical factors like design, pumps used, temperatures, pressures, design peculiarities, deaerator specifics, etc. It is this that is contrary to expectations based on concentration. That is, keeping the concentration of scavenger constant (current active chemical feed philosophies) is not the key to constant ORP (active chemical species feed philosophies described herein). For any given situation, the scavenger feed rate, as a function of feed water flow, would need to be calculated, which could be done theoretically or empirically. While the ideal would be to measure @T ORP readings and control based off @T ORP findings, one could base the oxygen scavenger flow off the exponential of FW flow, producing nearly constant @T ORP conditions.

Example 6

A constant ORP condition was achieved as the system changed in the following fashion (this is either known in theory or by laboratory or field data collection and analysis). At-T ORP (250° F.)=−400 mV versus the reference electrode for the following test conditions at the point of control and measurement. First, system flow rate was measured and sulfite feed concentration was calculated from the feed of known oxygen scavenger concentration to the given flow rate. In this case, initial DO concentration was 38 ppb prior to sulfite feed and 0.34 ppb after the sulfite feed of $8.06 \times 10^{-6}$ molar sodium sulfite. The system flow rate was 13,000 lb/hr. The second piece of information was that when the system flow rate drops off to 10,000 lb/hr, the initial DO concentration was 2.5 ppb prior to sulfite feed and 0.73 ppb after the sulfite feed of $2.35 \times 10^{-6}$ molar sodium sulfite. In the latter case, there was less oxygen entrapment, requiring less sulfite feed to obtain the identical @T ORP number. The REDOX stress situation is identical in both cases, however.

In this case, the following equation was derived from the above data.

$$\text{Scavenger Pump Speed (\%)} = 0.164 * e^{(0.00041 * FW \text{ Flow (lb/hr)})}$$

Thus, a FW flow of 13,000 lb/hr results in a sulfite pump speed of 33.9%. The sulfite feed concentration was $8.06 \times 10^{-6}$ molar sodium sulfite. A FW flow of 10,000 lb/hr, results in a sulfite pump speed of 9.9%. The sulfite feed concentration was $2.35 \times 10^{-6}$ molar sodium sulfite.

Example 7

Using the basics contained within a Nernstian-type Equation, setting the voltage term (ORP), one can calculate the required concentration of species to be fed to obtain a specific ORP value. For this Example, it is assumed that the only unknown is the reductant concentration, from which the reductant pump speed can be directly calculated. For one test (as in Example 6), the respective DO is known for two given flow rates (high flow rate and low flow rate condition). Knowing the thermodynamics and kinetics of reaction with oxygen scavenger to achieve a given ORP allows the user to solve the Nernstian-type equation for the reductant concentration. And knowing the system flow rate, one can then calculate the scavenger feed rate (pump speed) needed to achieve the desired (calculated) reductant concentration. This can be done both in cases of varying DO concentration and system flow rate to determine the control equation relating scavenger pump speed to system flowrate.

Example 8

Figure 6:
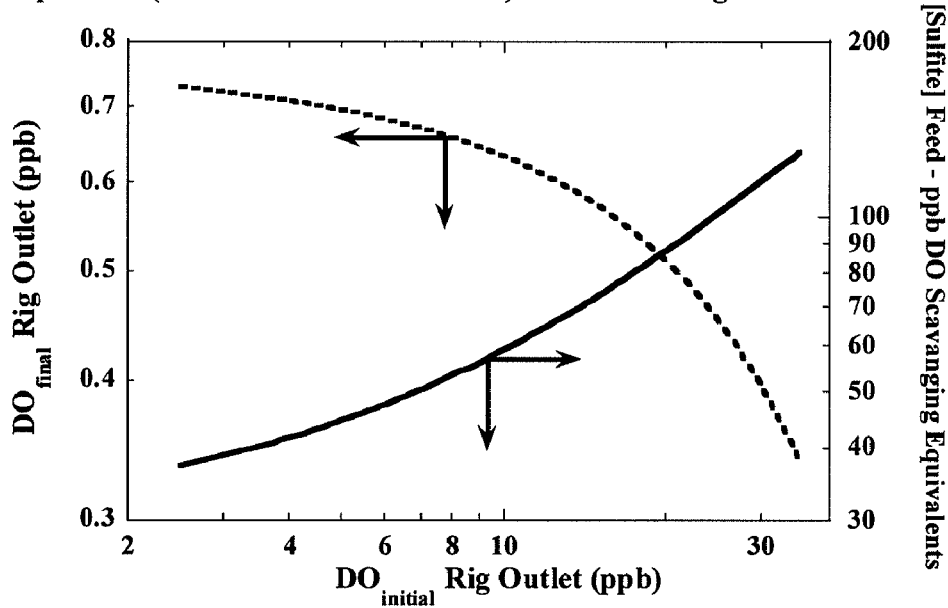
FIG. 6 shows inlet dissolved oxygen and sulfite feed concentrations (y2-axis) with resulting outlet dissolved oxygen concentrations (y1-axis) to achieve constant @T ORP conditions, as explained in Example 8.

In this Example, laboratory determined data is applied in the field. FIG. 6 showed measured dissolved oxygen and sulfite (reductant) concentrations as a function of flowrate. The pump speed data can be calculated as it relates to FW flow and the required oxygen scavenger concentration. For example, the concentration of sodium sulfite may be $1.865 \times 10^{-6}$ molar, where the fed product is 10% by weight sodium sulfite. The FW flow may about 10,000 kg/hr, the pump speed of the sulfite dose pump 10% at 50% pump stroke with a maximum pump output of about 470 ml/hr.

Therefore, pump speed %×pump stroke %×maximum pump output×1/system flow rate gives 235 ppb. The molar mass of sodium sulfite ($Na_2SO_3$) is 126 g/mole, so its concentration in the system is about $1.865\times10^{-6}$ molar. If the sulfite concentration is known, the above equation may be solved for pump speed. In this example, FW flow, initial DO (prior to addition of reductant), and DO after the feed of a known amount of reductant is known. While the concentration is linear with respect to FW flow, the concentration needed to maintain @T ORP, in different flow rates, is nonlinear. The same scheme could be generated at different flow rates, requiring a different sulfite concentration to maintain the same @T ORP (as illustrated in the FIG. 6). In this scheme, just two test flow rates would be sufficient to provide the data given in Example 6 above. Relating the dissolved oxygen values and scavenger feed concentrations to real field systems would allow one to assume similar behaviors to lab determined tests.

Example 9

This Example illustrates that it is possible to have a scavenger pump speed increase with decreasing flow rate. This concept is the inverse of the above examples. That is, the REDOX stress increases when flow rate decreases. This may happen, for example, if vacuum and pump seals leak in more air at lower flow rates, requiring more scavenger feed to counteract this type of REDOX stress event and return @T ORP values to previously obtained levels, prior to the flow decrease.

This is an actual field example. To maintain a constant @T ORP value the scavenger pump speeds are shown for two system FW flow rates:

| Scavenger Pump speed (%) | Flowrate (lb/hr) |
|---|---|
| 15 | 1,000,000 |
| 100 | 700,000 |

In this case, the equation for this system might be:

Scavenger Pump speed (%)=8364.8*$e$^(−6.3237e−6*Flowrate (lb/hr))

That is, the scavenger pump speed ramps up quickly, to maintain constant @T ORP conditions, as the flow rate approaches the lower flow condition due to the in-leakage of air in a condenser zone.

It should be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A method of preventing corrosion in an industrial water system by maintaining a real-time oxidation-reduction potential, ("ORP") at an ORP set point, wherein the system is at operating temperature and pressure, the method comprising:
    (a) determining the ORP set point;
    (b) determining the real-time ORP, wherein the real-time ORP is determined at operating temperature and pressure of the industrial water system and is based on at least one additional factor other than hydrazine concentration in said system;
    (c) determining concentrations of one or more active chemical species that influence the real-time ORP;
    (d) determining a flow rate;
    (e) creating a nonlinear control equation having as an input variable(s) one or more of the determined values from steps (a) to (d); and
    (f) calculating an output of the nonlinear control equation thereby determining an inflow of the active chemical species to the industrial water system to maintain the ORP set point.

2. The method of claim 1, wherein the industrial water system is a hot water system.

3. The method of claim 1, wherein the ORP set point is a range.

4. The method of claim 1, wherein the ORP set point is based on a theoretical calculation.

5. The method of claim 1, including determining the real-time ORP without directly measuring the real-time ORP.

6. The method of claim 1, wherein the real-time ORP is based on a theoretical calculation.

7. The method of claim 1, including determining the real-time ORP at a point of control without directly measuring the real-time ORP at the point of control.

8. The method of claim 1, including determining the real-time ORP by directly measuring the real-time ORP at any point in the industrial water system.

9. The method of claim 1, including determining the real-time ORP at a point in the industrial water system other than a point of control and calculating the real-time ORP at the point of control based upon the real-time ORP at said other point.

10. The method of claim 1, including determining the real-time ORP by measuring ORP at room temperature and calculating the real-time ORP.

11. The method of claim 1, including measuring concentrations of the active chemical species at a point of control.

12. The method of claim 1, including determining concentrations of the active chemical species based on theoretical calculations.

13. The method of claim 1, including measuring concentrations of the active chemical species at a point other than a point of control and calculating the concentrations of said species at the point of control based upon said measurements at said other point.

14. The method of claim 1, wherein at least one of the active chemical species is selected from the group consisting of: oxidants, reductants, and combinations thereof.

15. The method of claim 1, wherein the flow rate includes feedwater flow and/or steam flow and/or boiler blowdown flow and/or a measurement or calculation for steam losses.

16. The method of claim 1, wherein the flow rate includes feedwater flow from one or more sources and/or steam flow at one or more points.

17. The method of claim 1, wherein determining the flow rate includes directly measuring the flow rate, using a flow rate indicator, and/or calculating the flow rate.

18. The method of claim 17, wherein the input variable(s) includes the flow rate indicator and the output includes a signal operable to control the inflow of the active chemical species.

19. The method of claim 1, wherein the inflow of at least one of the active chemical species includes using a chemical dose-pump.

20. The method of claim 1, including iterating steps (b) to (d) a plurality of times prior to creating the nonlinear control equation.

21. The method of claim 20, wherein each iteration involves a different concentration of the active chemical species and/or a different flow rate.

22. The method of claim 20, including obtaining a first dataset with a first iteration and a second dataset with a second iteration, the first dataset including measured and/or theoretical data and the second dataset including measured and/or theoretical data.

23. The method of claim 22, including a plurality of iterations each with a corresponding dataset.

24. The method of claim 1, which is operable at a plurality of points in the industrial water system.

25. The method of claim 1, which is operable through a data network.

* * * * *